(12) United States Patent
Lee et al.

(10) Patent No.: US 11,140,612 B2
(45) Date of Patent: Oct. 5, 2021

(54) METHOD AND UE FOR TRIGGERING SIDELINK RESOURCE RESELECTION

(71) Applicant: LG Electronics Inc., Seoul (KR)

(72) Inventors: Jaewook Lee, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 134 days.

(21) Appl. No.: 16/331,342

(22) PCT Filed: Oct. 20, 2017

(86) PCT No.: PCT/KR2017/011625
§ 371 (c)(1),
(2) Date: Mar. 7, 2019

(87) PCT Pub. No.: WO2018/074874
PCT Pub. Date: Apr. 26, 2018

(65) Prior Publication Data
US 2019/0349836 A1 Nov. 14, 2019

Related U.S. Application Data

(60) Provisional application No. 62/410,867, filed on Oct. 21, 2016.

(51) Int. Cl.
*H04W 48/06* (2009.01)
*H04W 4/40* (2018.01)
(Continued)

(52) U.S. Cl.
CPC ............. *H04W 48/06* (2013.01); *H04W 4/40* (2018.02); *H04W 72/1268* (2013.01); *H04W 88/04* (2013.01)

(58) Field of Classification Search
CPC ... H04W 48/06; H04W 4/40; H04W 72/1268; H04W 88/04; H04W 72/02
See application file for complete search history.

(56) References Cited

U.S. PATENT DOCUMENTS 10,057,936 B2* 8/2018 Lee ....................... H04W 76/15
10,271,307 B2* 4/2019 Lee ................... H04W 72/0446
(Continued)

OTHER PUBLICATIONS

PCT International Search Report and Written Opinion in International Application No. PCT/KR2017/011625, dated Jan. 25, 2018, 9 pages.
(Continued)

*Primary Examiner* — Omar J Ghowrwal
(74) *Attorney, Agent, or Firm* — Fish & Richardson P.C.

(57) ABSTRACT

The present invention relates to a wireless communication system. More specifically, the present invention relates to a method and a device for triggering resource reselection for sidelink transmission prioritized over the uplink transmission in wireless communication system, the method comprising: performing an autonomous denial procedure for uplink transmission when uplink transmission and sidelink transmission are overlapped in a subframe, wherein the subframe is one of subframes allowed for denial of the uplink transmission during a validity period; triggering sidelink resource reselection if a number of subframes for which the UE is required to deny any uplink transmission during the autonomous denial procedure is above a threshold value; and performing the sidelink resource reselection.

10 Claims, 10 Drawing Sheets

(51) Int. Cl.
*H04W 72/12* (2009.01)
*H04W 88/04* (2009.01)

(56) References Cited

U.S. PATENT DOCUMENTS

| | | | | |
|---|---|---|---|---|
| 2014/0092761 | A1* | 4/2014 | Behravan | H04W 24/00 |
| | | | | 370/252 |
| 2015/0043446 | A1 | 2/2015 | Tsirtsis et al. | |
| 2017/0339671 | A1* | 11/2017 | Lee | H04W 72/12 |
| 2018/0077719 | A1* | 3/2018 | Nory | H04W 28/0278 |
| 2018/0263026 | A1* | 9/2018 | Loehr | H04W 72/10 |
| 2018/0324823 | A1* | 11/2018 | Martin | H04W 76/14 |
| 2019/0190678 | A1* | 6/2019 | Sorrentino | H04L 5/0044 |

OTHER PUBLICATIONS

CATT, "On Prioritization of SL TX for V2X under eNB management," R1-1608723, 3GPP TSG RAN WG1 Meeting #86bis, Lisbon, Portugal, Oct. 10-14, 2016, 2 pages.
NTT Docomo, Inc., "Discussion on eNB management of prioritizing V2x SL Tx over WAN Tx," R1-1610036, 3GPP TSG RAN WG1 Meeting #86bis, Lisbon, Portugal, Oct. 10-14, 2016, 4 pages.
Samsung, "Coexistence of PC5-based V2V operation and legacy Uu operation," R1-1608993, 3GPP TSG RAN WG1 #86bis, Lisbon, Portugal, Oct. 10-14, 2016, 3 pages.
Qualcomm Incorporated, "Sidelink gap for V2V transmission," R1-1609963, 3GPP TSG-RAN WG1 #86bis, Lisbon, Portugal, Oct. 10-14, 2016, 3 pages.

* cited by examiner

[Fig. 1]
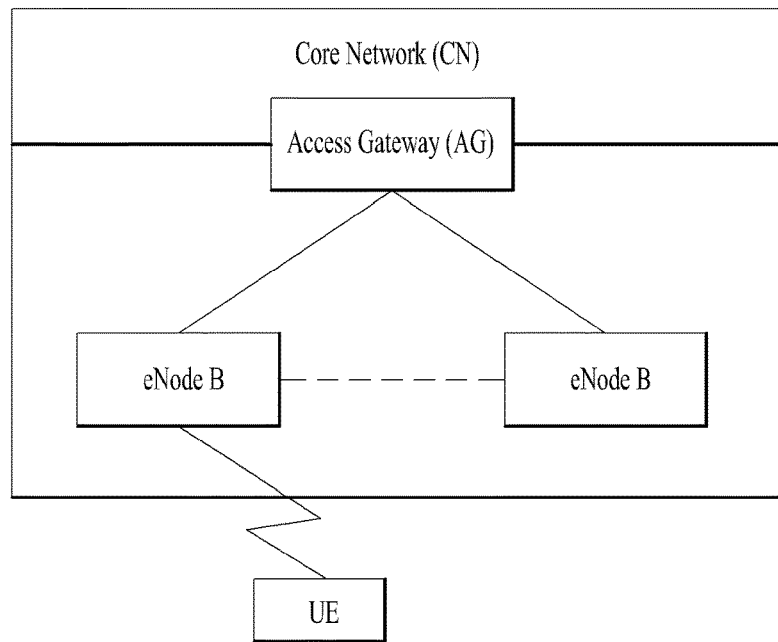
[Fig. 2A]
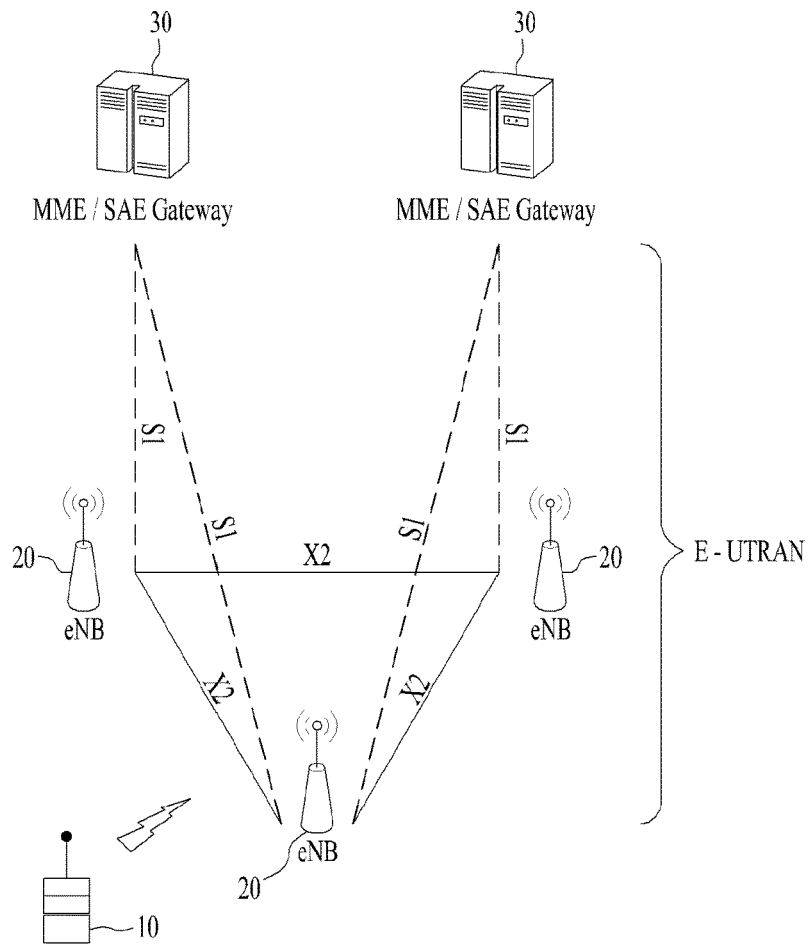

[Fig. 2B]
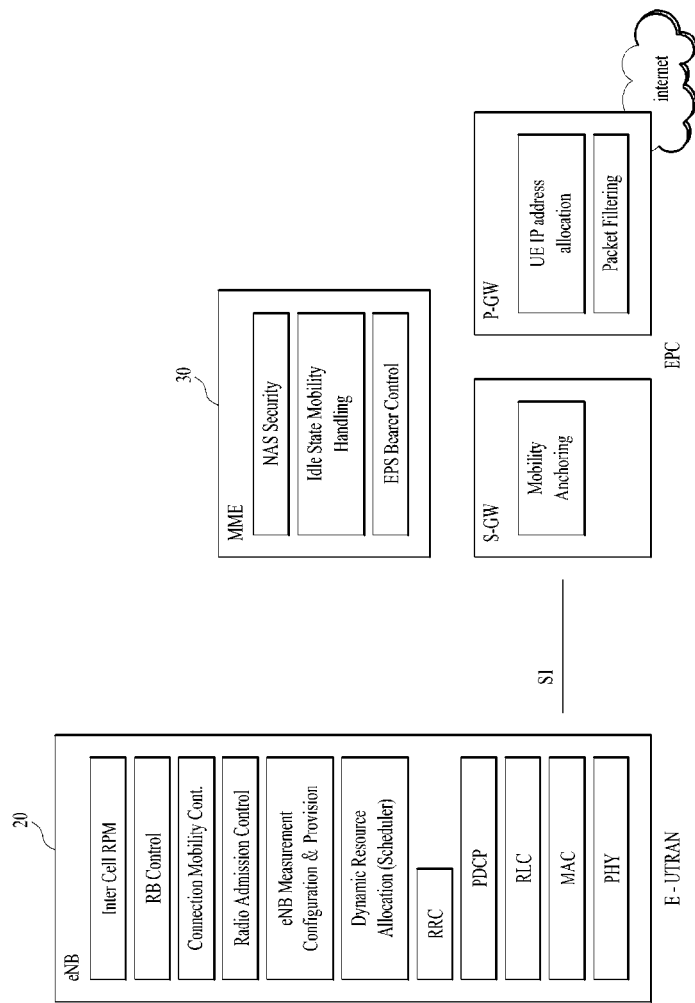

[Fig. 3]
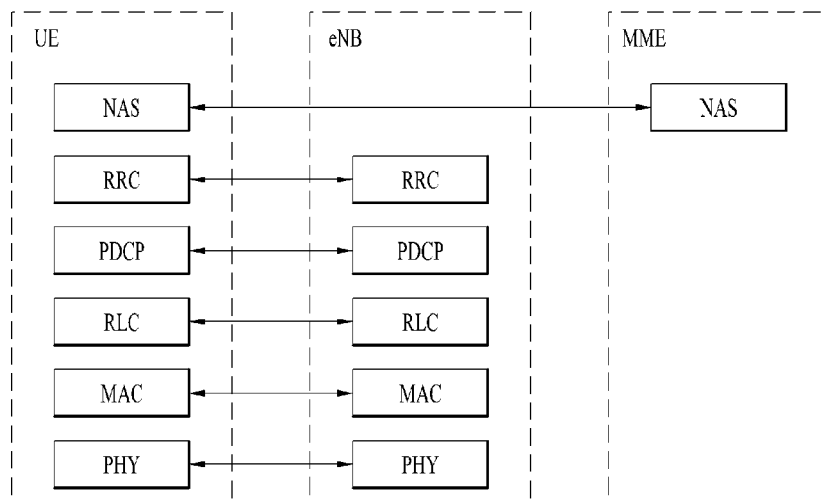
(a) Control-Plane Protocol Stack
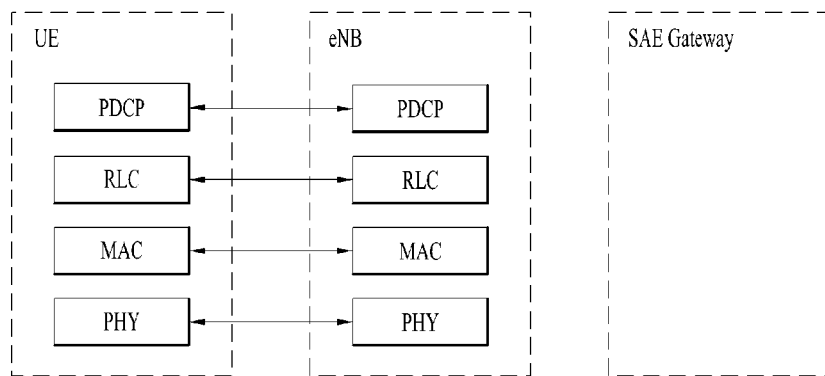
(b) User-Plane Protocol Stack
[Fig. 4]
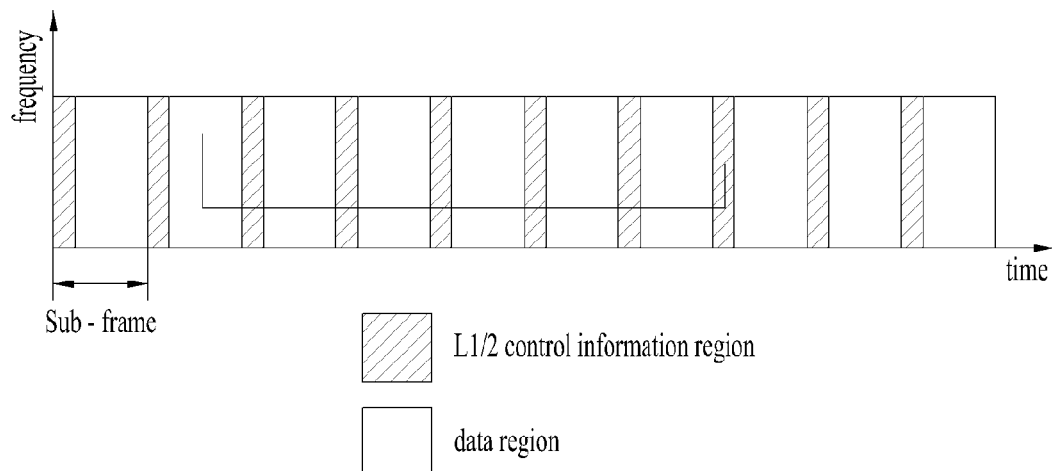

[Fig. 5]
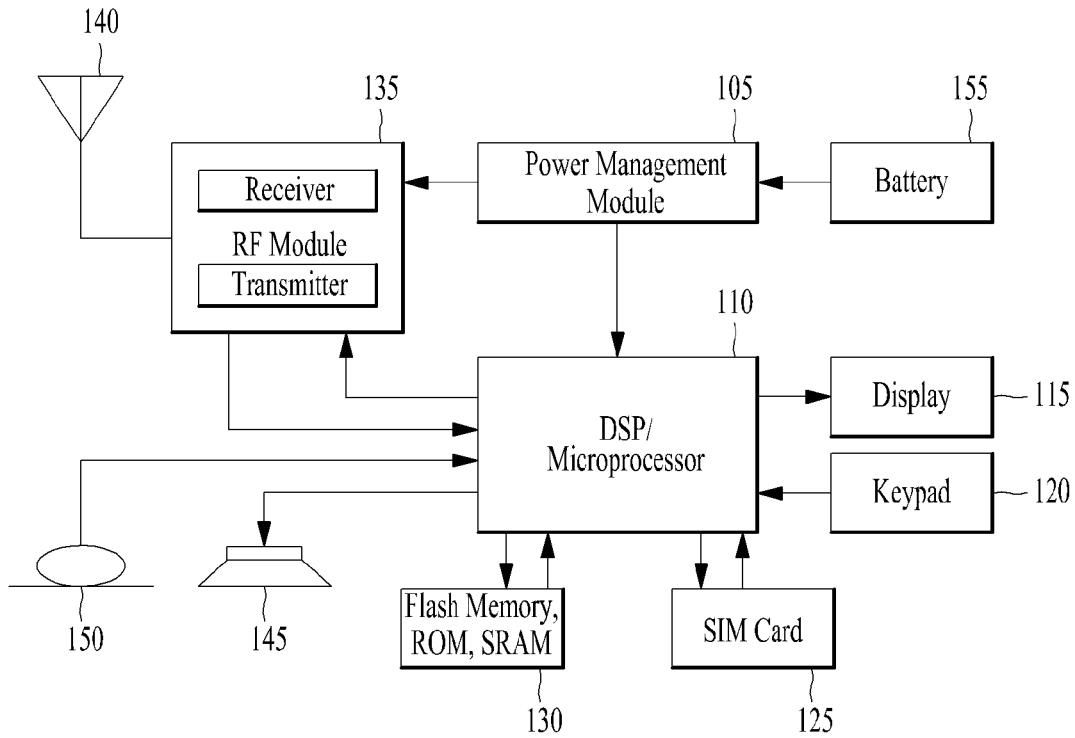
[Fig. 6]
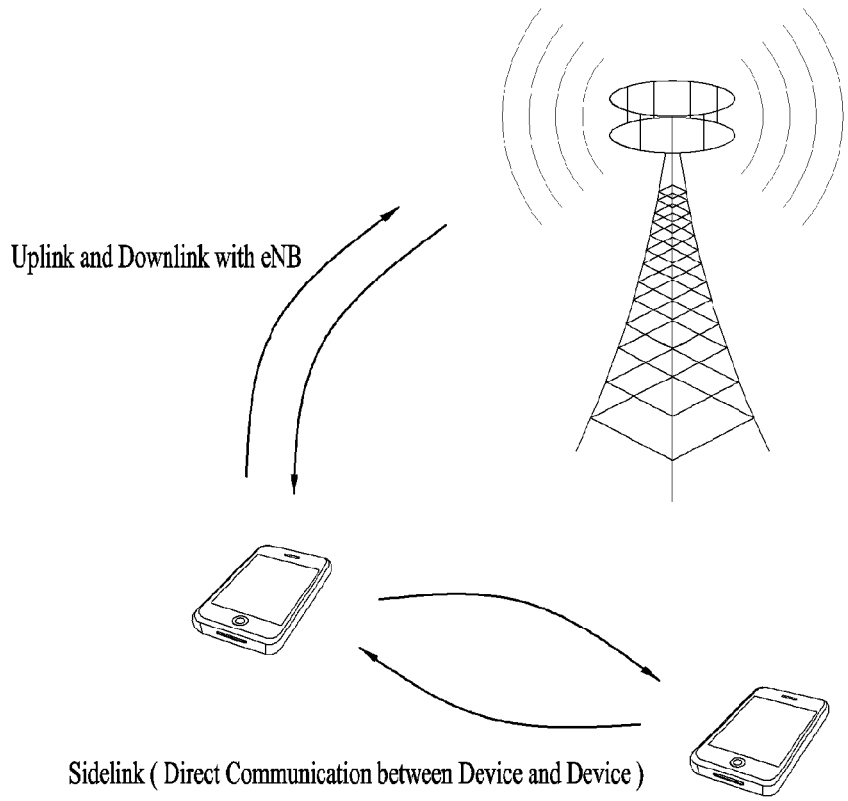
Sidelink ( Direct Communication between Device and Device )

[Fig. 7a]
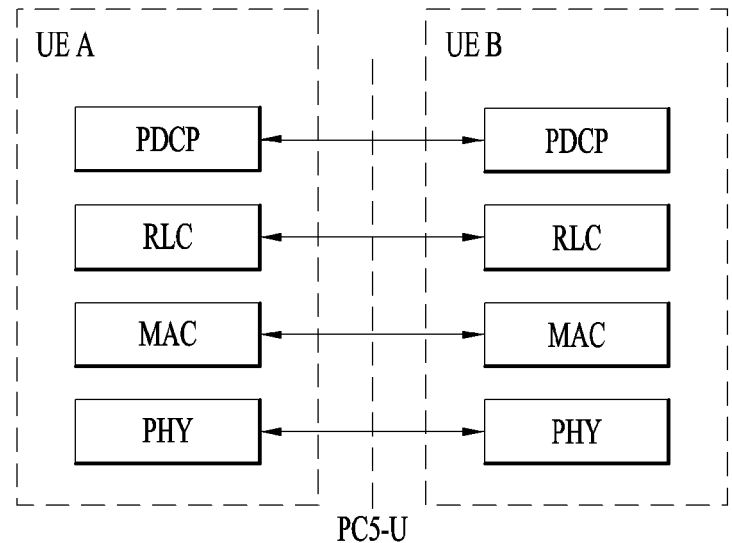
[Fig. 7b]
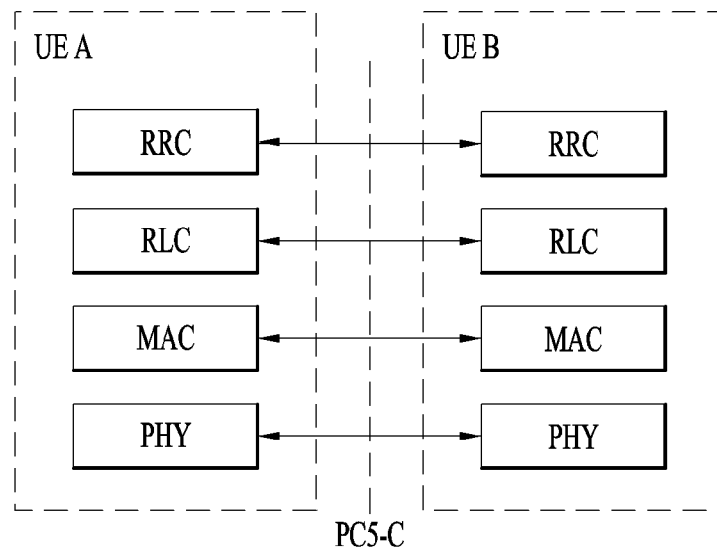

[Fig. 7c]
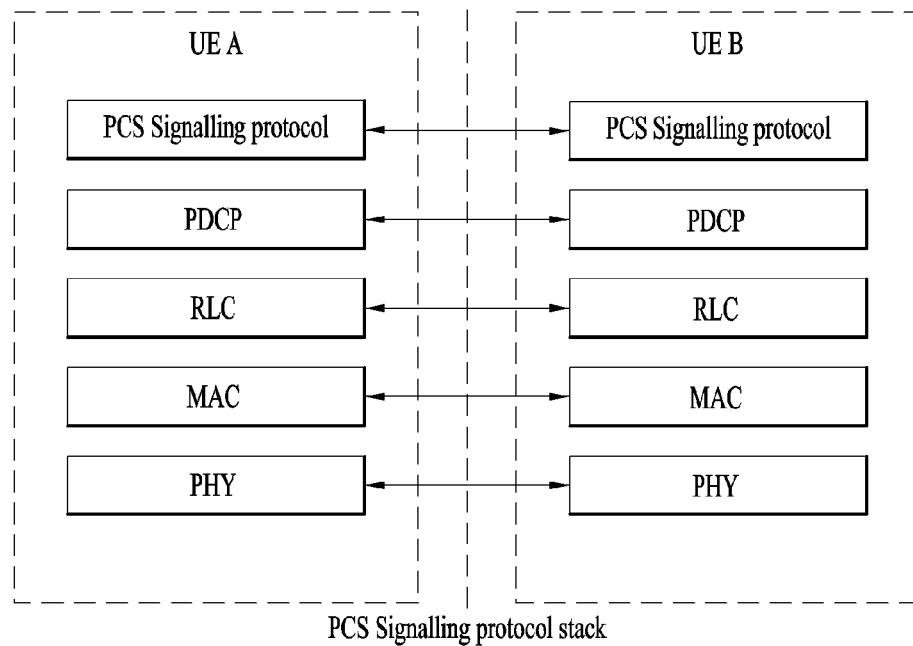
PCS Signalling protocol stack
[Fig. 8]
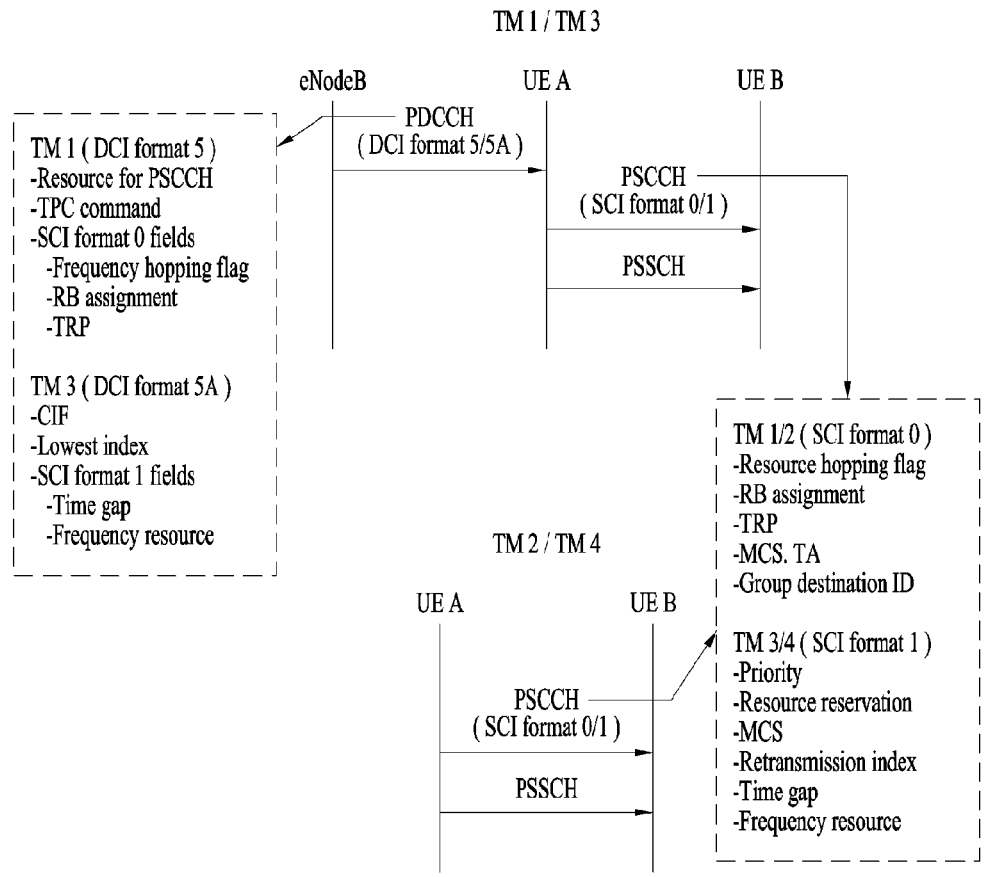

[Fig. 9]
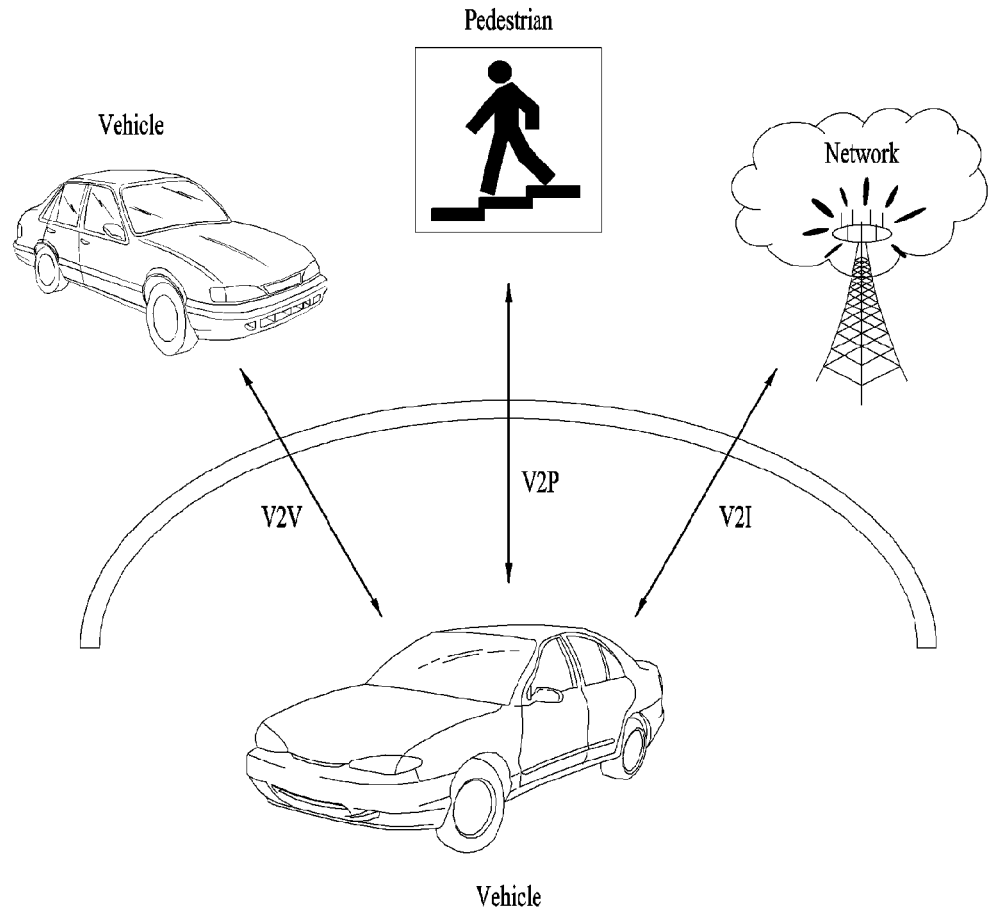
[Fig. 10a]
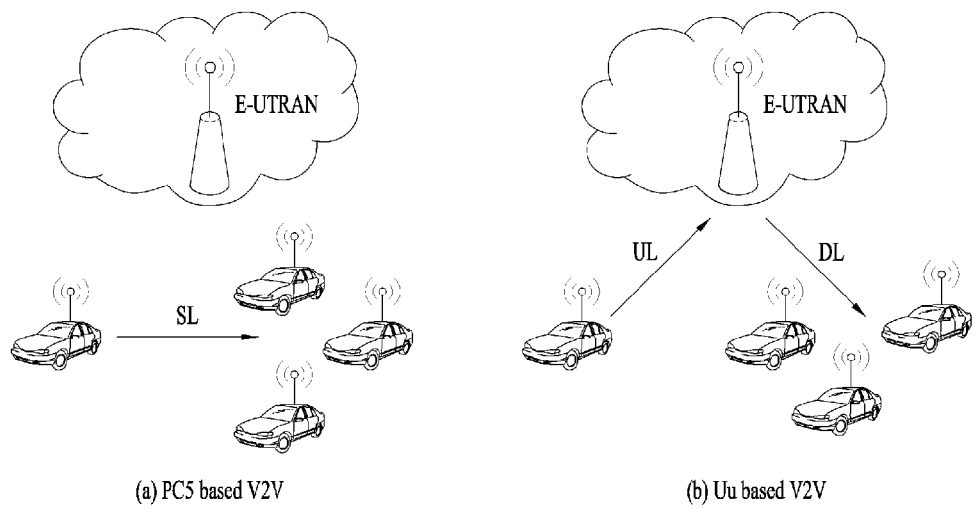

[Fig. 10b]
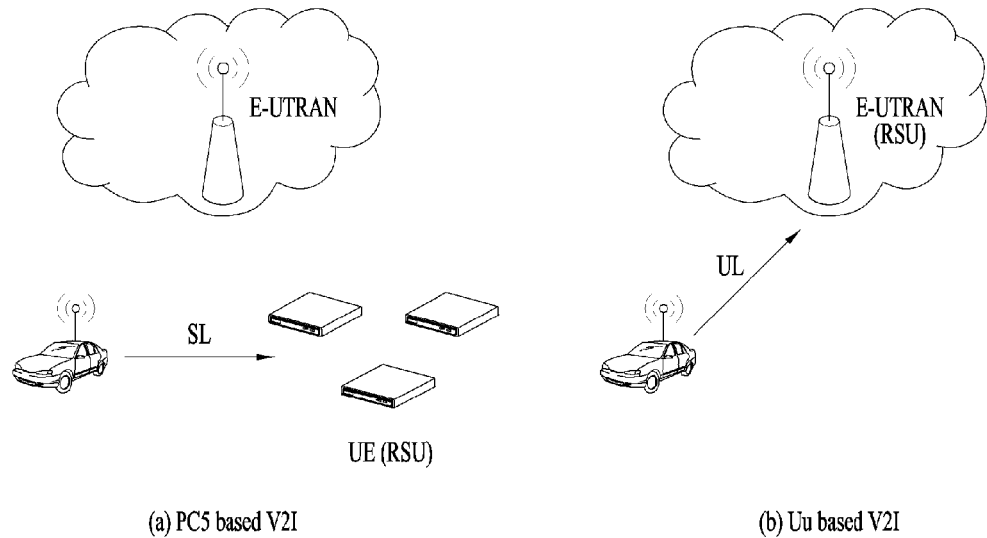
(a) PC5 based V2I (b) Uu based V2I
[Fig. 10c]
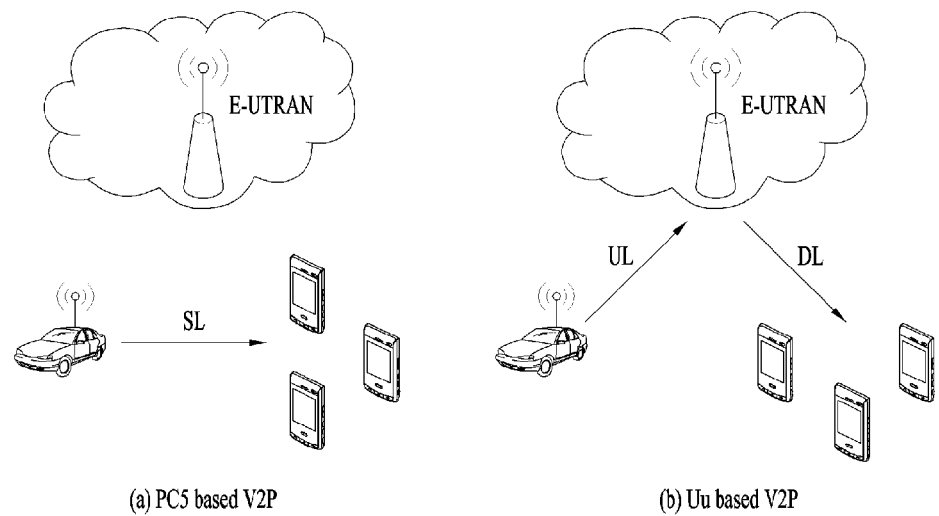
(a) PC5 based V2P (b) Uu based V2P

[Fig. 11]
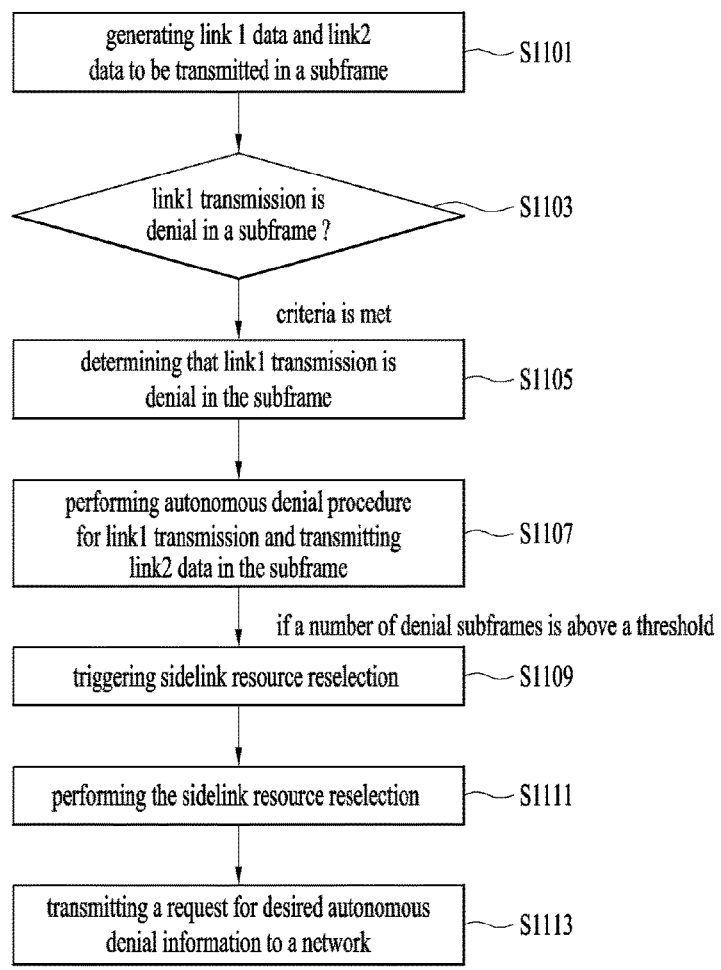

[Fig. 12]
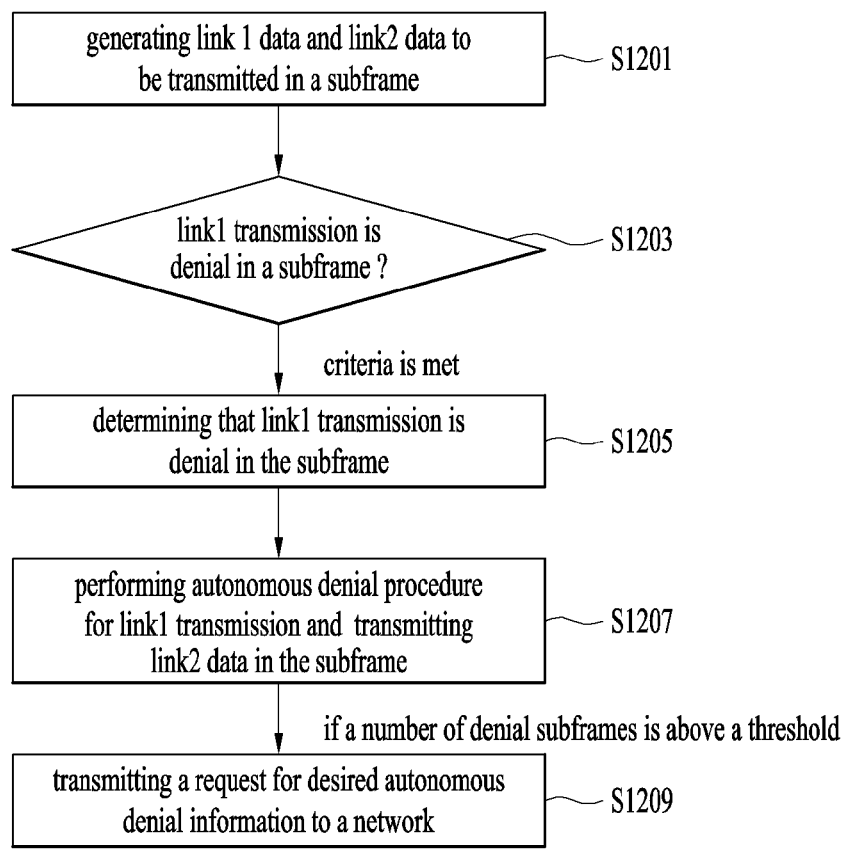

METHOD AND UE FOR TRIGGERING SIDELINK RESOURCE RESELECTION

CROSS-REFERENCE TO RELATED APPLICATIONS

This application is a National Stage application under 35 U.S.C. § 371 of International Application No. PCT/KR2017/011625, filed on Oct. 20, 2017, which claims the benefit of U.S. Provisional Application No. 62/410,867, filed on Oct. 21, 2016. The disclosures of the prior applications are incorporated by reference in their entirety.

TECHNICAL FIELD

The present invention relates to a wireless communication system and, more particularly, to a method for triggering resource reselection for sidelink transmission prioritized over the uplink transmission in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARM)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for triggering resource reselection for sidelink transmission prioritized over the uplink transmission.

The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

In this invention, it is proposed of method of triggering sidelink resource reselection or transmitting a request for desired autonomous denial information to a network, if a number of subframes for which the UE is allowed to deny any uplink transmission during the autonomous denial procedure is above a threshold value, in case of performing autonomous denial for uplink transmission when uplink transmission and sidelink transmission are overlapped in a subframe.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a conceptual diagram for sidelink communication;

FIG. 7a is a diagram for protocol stack for the user plane of sidelink communication, FIGS. 7b and 7c are diagrams for protocol stack for the control plane of sidelink communication;

FIG. 8 is a diagram for various transmission modes for Sidelink;

FIG. 9 is a conceptual diagram for Vehicle-to-Everything (V2X) communication;

FIG. 10a is a diagram for V2V operation scenario, FIG. 10b is a diagram for V2I operation scenario, and FIG. 10c is a diagram for V2P operation scenario;

FIG. 11 is a conceptual diagram for triggering sidelink resource reselection for sidelink transmission prioritized over uplink transmission in wireless communication system according to embodiments of the present invention; and FIG. 12 is an example for transmitting a request for desired autonomous denial information for sidelink transmission prioritized over uplink transmission in wireless communication system according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is a conceptual diagram for sidelink communication.

Sidelink comprises sidelink discovery, sidelink communication and V2X sidelink communication between UEs. Sidelink uses uplink resources and physical channel structure similar to uplink transmissions. However, some changes, noted below, are made to the physical channels. Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe. For V2X sidelink communication, PSCCH and PSSCH are transmitted in the same subframe. The sidelink physical layer processing of transport channels differs from UL transmission in the following steps: for PSDCH and PSCCH, the scrambling is not UE-specific; and modulation of 64 QAM and 256 QAM is not supported for sidelink PSCCH is mapped to the sidelink control resources. PSCCH indicates resource and other transmission parameters used by a UE for PSSCH. For PSDCH, PSCCH and PSSCH demodulation, reference signals similar to uplink demodulation reference signals are transmitted in the 4-th symbol of the slot in normal CP and in the 3rd symbol of the slot in extended cyclic prefix. The sidelink demodulation reference signals sequence length equals the size (number of sub-carriers) of the assigned resource. For V2X sidelink communication, reference signals are transmitted in 3rd and 6th symbols of the first slot and 2nd and 5th symbols of the second slot in normal CP. For PSDCH and PSCCH, reference signals are created based on a fixed base sequence, cyclic shift and orthogonal cover code. For V2X sidelink communication, cyclic shift for PSCCH is randomly selected in each transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorised to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronisation signal and SBCCH in one subframe and transmit synchronisation signal and SBCCH on another subframe if UE becomes synchronization source based on defined criterion.

The UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order in case Sidelink Discovery Gap is not configured:
  i) Uu transmission/reception (highest priority);
  ii) PC5 sidelink communication transmission/reception;
  iii) PC5 sidelink discovery announcement/monitoring (lowest priority).

The UE performs transmission and reception over Uu and PC5 with the following decreasing priority order in case Sidelink Discovery Gap is configured:
  i) Uu transmission/reception for RACH;
  ii) PC5 sidelink discovery announcement during a Sidelink Discovery Gap for transmission;
  iii) Non-RACH Uu transmission;
  iv) PC5 sidelink discovery monitoring during a Sidelink Discovery Gap for reception;
  v) Non-RACH Uu reception;
  vi) PC5 sidelink communication transmission/reception.

FIG. 7a is a diagram for protocol stack for the user plane of sidelink communication, FIGS. 7b and 7c are diagrams for protocol stack for the control plane of sidelink communication;

FIG. 7a shows the protocol stack for the user plane, where PDCP, RLC and MAC sublayers (terminate at the other UE) perform the functions listed for the user plane. The Access Stratum protocol stack in the PC5 interface consists of PDCP, RLC, MAC and PHY as shown below in FIG. 7a.

User plane details of sidelink communication: i) there is no HARQ feedback for sidelink communication; ii) RLC UM is used for sidelink communication; iii) a receiving UE needs to maintain at least one RLC UM entity per transmitting peer UE; iv) a receiving RLC UM entity used for sidelink communication does not need to be configured prior to reception of the first RLC UMD PDU; v) a ROHC Unidirectional Mode is used for header compression in PDCP for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

A UE does not establish and maintain a logical connection to receiving UEs prior to one-to-many a sidelink communication. Higher layer establishes and maintains a logical connection for one-to-one sidelink communication including ProSe UE-to-Network Relay operation.

The Access Stratum protocol stack for SBCCH (Sidelink Broadcast Control Channel) in the PC5 interface consists of RRC, RLC, MAC and PHY as shown below in FIG. 7b.

The control plane for establishing, maintaining and releasing the logical connection for one-to-one sidelink communication is shown in FIG. 7c.

FIG. 8 is a diagram for various transmission modes for Sidelink. As shown in FIG. 8, the 3GPP sidelink communication supports a total of four transmission modes (TM). Here, TM1 is a base station scheduling mode in D2D/eD2D, and TM2 is a terminal autonomous scheduling mode in D2D/eD2D. Meanwhile, TM 3 is a base station scheduling mode in V2X, and TM 4 is a terminal autonomous scheduling mode in V2X.

Scheduled resource allocation (TM1, 3) is characterized by: i) the UE needs to be RRC_CONNECTED in order to transmit data; ii) the UE requests transmission resources from the eNB. The eNB schedules transmission resources for transmission of sidelink control information and data.

In this case, the UE sends a scheduling request (D-SR or Random Access) to the eNB followed by a Sidelink BSR. Based on the Sidelink BSR the eNB can determine that the UE has data for a sidelink communication transmission and estimate the resources needed for transmission. eNB can schedule transmission resources for sidelink communication using configured SL-RNTI.

The UE autonomous resource selection (TM2, 4) is characterized by:

i) A UE on its own selects resources from resource pools and performs transport format selection to transmit sidelink control information and data;

ii) There can be up to 8 transmission pools either pre-configured for out of coverage operation or provided by RRC signalling for in-coverage operation. Each pool can have one or more PPPP associated with it. For transmission of a MAC PDU, the UE selects a transmission pool in which one of the associated PPPP is equal to the PPPP of a logical channel with highest PPPP among the logical channel identified in the MAC PDU. It is up to UE implementation how the UE selects amongst multiple pools with same associated PPPP. There is a one to one association between sidelink control pool and sidelink data pool;

iii) Once the resource pool is selected, the selection is valid for the entire Sidelink Control period. After the Sidelink Control period is finished the UE may perform resource pool selection again.

FIG. 9 is a conceptual diagram for Vehicle-to-Everything (V2X) communication.

Referring to FIG. 13, the vehicular communication, referred to as Vehicle-to-Everything (V2X), can be divided into three different types including Vehicle-to-Vehicle (V2V) Communications, Vehicle-to-Infrastructure (V2I) Communications and Vehicle-to-Pedestrian (V2P) Communications.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorised to be used for V2X services can perform V2X sidelink communication.

The pace of LTE network deployment is accelerating all over the world, which enables more and more advanced services and Internet applications making use of the inherent benefits of LTE, such as higher data rate, lower latency and enhanced coverage. Widely deployed LTE-based network provides the opportunity for the vehicle industry to realize the concept of 'connected cars'. By providing a vehicle with an access to the LTE network a vehicle can be connected to the Internet and other vehicles so that a broad range of existing or new services can be envisaged. Vehicle manufacturers and cellular network operators show strong interests in vehicle wireless communications for proximity safety services as well as commercial applications.

In order to respond to this situation, RAN approved the feasibility study on LTE-based V2X services to evaluate new functionalities needed to operate LTE-based V2X (V2V, V2I/N, and V2P), and to investigate potential enhancements for vehicular services.

FIG. 10a is a diagram for V2V operation scenario, FIG. 10b is a diagram for V2I operation scenario, and FIG. 10c is a diagram for V2P operation scenario.

V2X communication refers to a communication system that exchanges information such as traffic conditions while communicating with road infrastructure and other vehicles while driving a vehicle.

V2X includes a vehicle-to-pedestrian (V2P), which means communication between vehicles, a Vehicle to Pedestrian (V2P), which means communication between terminals carried by a vehicle and an individual, a Vehicle-to-Infrastructure/Network (V2I/N), which means communication between the vehicle and the roadside unit (RSU) such as transportation infrastructure and the network.

For V2X, the following can be considered: i) a scenario for V2X operation based on a PC5 interface which is an interface between UEs (FIG. 10a), ii) a scenario for V2V operation based on a Uu interface which is an interface between a base station (eNodeB) and a UE (FIG. 10b), iii) iii) Scenario supporting V2V operation using both PC5 interface and Uu interface (FIG. 10c).

When sidelink transmission for V2X and Uu occurs at the same time/subframe, the UE may prefer to select one transmission in order to reduce interference. In this case, how to prioritize the V2X or Uu is not determined yet.

As described above, basically, when the PC5 sidelink transmission and Uu transmission overlap, the Uu transmission/reception (highest priority) is prioritized over PC5 sidelink communication transmission/reception. In case Sidelink Discovery Gap is configured, PC5 sidelink discovery announcement has highest priority except Uu transmission/reception for RACH.

For prioritization between Uu and PC5 V2V, there is no agreed solution for now. As one of the methods, autonomous denial of Uu transmission can be considered in order to protect the transmission of sidelink when there are Uu transmission and sidelink transmission at the same time/subframe.

During autonomous denial procedure, the UE counts a number of the denial subframes of the uplink transmission during the validity period including previous subframes and the subframe, and determines that the uplink transmission is denial until the number of the denial subframes reaches the threshold value. In this case, it is likely that there could be scenario more UL data to be denied above the threshold. If the sidelink message is not transmitted, it could harm the QoS of the system since the message is relate to the safety. For this case, it is necessary to define a method to resolve this situation.

Currently, the following conditions for sidelink resource reselection is defined in MAC specification (TS36.321):

if SL_RESOURCE_RESELECTION_COUNTER=0 and when SL_RESOURCE_RESLECTION_COUNTER was equal to 1 the MAC entity randomly selected, with equal probability, a value in the interval [0, 1] which is above the probability configured by upper layers in probResourceKeep; or if there is no configured sidelink grant, or if the configured sidelink grant cannot accommodate a RLC SDU by using the maximum allowed MCS configured by upper layers in maxMCS-PSSCH and the MAC entity selects not to segment the RLC SDU; or if a pool of resources is configured or reconfigured by upper layers:

It may be necessary to extend sidelink resource reselection triggering conditions due to drop of Uu transmissions when the SL transmission and the Uu transmission are overlapped.

FIG. 11 is a conceptual diagram for triggering sidelink resource reselection for sidelink transmission prioritized over uplink transmission in wireless communication system according to embodiments of the present invention.

In this invention, it is proposed of method of triggering sidelink resource reselection. The method comprises of receiving autonomous denial configuration, performing autonomous denial, detecting triggering condition of sidelink resource reselection and performing sidelink resource reselection.

When link1 data and link2 data to be transmitted in a subframe are generated by a UE, the UE determines whether link1 transmission is denial in a subframe (S1101).

Preferably, the link1 and link2 can be either uplink or sidelink.

The UE considers that link2 transmission is prioritized over the link1 transmission if a criteria is met (S1103) and the UE determines that link1 transmission is denial in the subframe (S1105).

Preferably, criteria information is provided by a network, and criteria information includes priority information, service/application information, sidelink SPS index or sidelink logical channel identity.

Preferably, the priority indicates ProSe Per Packet Priority (PPPP) or logical channel priority. Using other priority information for the above invention is not excluded.

When the network provides threshold priority information as criteria information, the UE is allowed perform denial of link1 transmission, if the UE has link2 data of a priority which is equal to or above the threshold priority information.

Preferably, a higher value of priority indicates a higher priority, or a lower value of priority indicates a higher priority.

For example, in case that a lower value of priority indicates a higher priority, if there are MAC PDUs to be transmitted in this TTI in uplink and in sidelink and a value of the highest priority of the sidelink logical channel(s) in the MAC PDU is lower than a threshold priority, the UE determine that sidelink transmission is prioritized over uplink transmission and sidelink process of the UE transmits sidelink data.

When the network provides list of allowed priority information as criteria information, the UE is allowed perform denial of link1 transmission, if the UE has link2 data of a priority which belongs to the given priority information. For data of a priority which does not belong to the given priority information, the UE is not allowed to perform denial of link1 transmission.

When the network provides service/application information as criteria information, service/application information includes sidelink discovery, sidelink communication, wearable sidelink communication or V2X communication, and so on.

If service information is provided with the above information, the UE is allowed to perform denial of link1 transmission only when there are link1 data transmission and link2 data transmission of the indicated service at the same time. For instance, if 'V2X' is indicated, the UE is allowed to perform denial of link1 transmission when there are link1 data transmission and link2 data transmission for V2X at the same time. For other data over link2, the UE does not perform denial of link1 transmission.

If service information is not provided, the UE is allowed to perform denial of link1 for any link2 operation regardless of applications/services. Alternatively, if service information is not provided, the UE is allowed to perform denial of link1 for predefined link2 operation/application/service.

When the network provides sidelink SPS index or sidelink logical channel identity as criteria information, the UE is allowed to perform denial of link1 only when there are link1 data transmission and link2 data transmission of the indicated sidelink SPSs or sidelink logical channels at the same time.

When the UE determines that link1 transmission is denial in the subframe, the UE performs autonomous denial procedure for link1 transmission and transmits link2 data in the subframe (S1107).

The autonomous denial procedure for link1 transmission includes: counting the number of the denial subframes of the link1 transmission during the validity period including previous subframes and the subframe, and determining that the link 1 transmission is denial until the number of the denial subframes reaches a maximum number.

Preferably, Autonomous denial information for performing autonomous denial procedure is configured by the network via dedicated and/or broadcast signalling.

Preferably, Autonomous denial information is provided with criteria information by a network.

Preferably, Autonomous denial information includes autonomousDenialSubframes, and autonomousDenialValidity.

The "autonomousDenialSubframes" indicates that the maximum number of the link1 subframes for which the UE is allowed to deny any link1 transmission. Value n2 corresponds to 2 subframes, n5 to 5 subframes and so on.

The "autonomousDenialValidity" indicates the validity period over which the link1 autonomous denial subframes shall be counted. Value sf200 corresponds to 200 subframes, sf500 corresponds to 500 subframes and so on.

When the UE performs autonomous denial procedure for link1 transmission, the UE counts the number of denials of subframes for link1 transmission over a validity period including previous subframes and a current subframe indicated by autonomousDenialValidity, and denying scheduled link1 transmission at the current subframe if the number of denials of subframes for link1 transmission is less than a threshold indicated by utonomousDenialSubframes.

Preferably, the autonomous denial procedure includes 3 types of denial.

In case of per-UE based denial, the UE denies scheduled link1 transmission which occurs at the same time/subframe of any link2 transmission and sums up all the denials and compares with threshold. In this case, the network doesn't provide other criteria information or, network signals that link1 denial is counted and compared with denial threshold per UE.

In case of per-resource reservation process based denial, the network signals that link1 denial is counted and compared with denial threshold per resource reservation process. If this is signalled, the UE counts the number of autonomous denials of link1 transmission for each resource reservation process separately and compares the counted number with the autonomousDenialSubframes for each resource reservation process. In other words, if the link1 transmission is denied due to link2 transmission of resource reservation process 1, the UE adds to the number of denials for resource reservation process 1. If the link1 transmission is denied due to simultaneous link2 transmissions of resource reservation process 1 and resource reservation process 2, the UE adds to the each number of denials for resource reservation process 1 and resource reservation process 2.

In case of per-priority/logical channel/SPS/service based denial, if associated priorities/logical channels/SPS index/service information is provided with autonomous denial information, the UE only counts the number of autonomous denials of link1 transmission for protection of link2 transmission of associated priorities/logical channels/SPSs/services separately and compares the counted number with the associated autonomousDenialSubframes. If multiple sets of autonomous denial information and associated criteria information are provided, the UE counts the number of link1 autonomous denials performed for associated priorities/logical channels/SPSs/services of each set separately and compares the counted number with the associated autonomousDenialSubframes of the set. If the link1 transmission is denied due to simultaneous link2 transmissions associated with multiple priorities/logical channels/SPSs/service of the multiple set, the UE increases the number of denials for each set.

Alternatively, if the link1 transmission is denied due to link2 transmission of one PDU associated with multiple priorities of the multiple set, the UE increases the number of denials for the set of highest priorities.

One or more set of autonomous denial information per one or more criteria can be provided. For instance, One set of autonomous denial information consists of the above autonomous denial information and associated priority information. The example of multiple set is shown below Table 1:

TABLE 1

Set 1: AutonomousDenialSubframe: n30, AutonomousDenialValidity: sf500, Priority: Prio7, prio8
Set 2: AutonomousDenialSubframe: n15, AutonomousDenialValidity: sf500, Priority: Prio4, prio5, prio6
Set 3: AutonomousDenialSubframe: n5, AutonomousDenialValidity: sf500, Priority: Prio1, prio2, prio3, prio4

In the above example, for transmission of link2 data having priority 7 or priority 8, the UE applies the n30 as autonomousDenialSubframe and sf500 as autonomousDenialValidity. For transmission of link2 data having priority 4, priority 5 or priority 6, the UE applies the n15 as autonomousDenialSubframe and sf500 as autonomousDenialValidity.

Another example of signalling regarding service is shown below Table 2.

TABLE 2

Set 1: AutonomousDenialSubframe: n30, AutonomousDenialValidity: sf500, Service: V2X communication
Set 2: AutonomousDenialSubframe: n15, AutonomousDenialValidity: sf500 Service: Sidelink communication
Set 3: AutonomousDenialSubframe: n5, AutonomousDenialValidity: sf500, Priority: Sidelink discovery In the above example, different denial information is applied for each link2 service. For example, for V2X communication, the UE applies the n30 as autonomousDenialSubframe and sf500 as autonomousDenialValidity.

The UE triggers sidelink resource reselection if a number of subframes for which the UE denied any uplink transmission during the validity period is above a threshold value (S1109).

Preferably, validity period and threshold value indicates autonomousDenialValidity and autonomousDenialSubframes respectively which are configured via autonomous denial configuration.

The "autonomousDenialSubframes" indicates that the maximum number of the link1 subframes for which the UE is allowed to deny any link1 transmission. Value n2 corresponds to 2 subframes, n5 to 5 subframes and so on.

The "autonomousDenialValidity" indicates the validity period over which the link1 autonomous denial subframes shall be counted. Value sf200 corresponds to 200 subframes, sf500 corresponds to 500 subframes and so on.

If the number of link1 subframe for which the UE is required to deny or the UE has denied any link1 transmission during the (configured) validity period is above the currently configured threshold value, the UE triggers sidelink resource reselection for all the resource reservation processes.

If the number of link1 subframe for which the UE is required to deny or the UE has denied any link1 transmission for transmission of data of a certain resource reservation process during the (configured) validity period is above the currently configured threshold value, the UE triggers sidelink resource reselection for the resource reservation process.

If the number of link1 subframe for which the UE is required to deny or the UE has denied any link1 transmission for transmission of data of associated priorities, services, SPSs and/or logical channels during the (configured) validity period is above the currently configured threshold value for priority(ies), service, SPSs, and/or logical channels, the UE triggers sidelink resource reselection for the resource reservation process associated with priorities, services, SPSs and/or logical channels.

If multiple associated criteria among priorities, services, SPSs and logical channels are provided for autonomous denial configuration, the UE triggers sidelink resource reselection for the resource reservation process associated with associated multiple criteria if the number of link1 subframe for which the UE is required to deny or the UE has denied any link1 transmission for transmission of data of associated multiple criteria during the (configured) validity period is above the currently configured threshold value for multiple associated criteria.

For instance, if priority and service information are provided for autonomous denial configuration, the UE triggers sidelink resource reselection for the resource reservation process associated with the configured priority and service if the number of link1 subframe for which the UE is required to or the UE has denied deny any link1 transmission for transmission of data of the configured priority and service during the (configured) validity period is above the current threshold value configured for the priority and service.

Preferably, when the autonomous denial is necessary at the current subframe and the number of link1 subframe for which the UE is required to deny or the UE has denied any link1 transmission during the (configured) validity period is above the currently configured threshold value; or when the UE expects that the number of link1 subframe for which the UE is required to deny or the UE has denied any link1 transmission during the (configured) validity period is above the currently configured threshold value, the UE can trigger sidelink resource reselection.

The UE performs the sidelink resource reselection (S1111).

The sidelink resource reselection includes: the MAC entity should clear the configured sidelink grant; select one of the allowed values configured by upper layers in restrictResourceReservationPeriod and set the resource reservation interval by multiplying 100 with the selected value; select the number of HARQ retransmissions from the allowed numbers configured by upper layers in allowedRetxNumberPSSCH, and an amount of frequency resources within the range configured by upper layers between minRB-NumberPSSCH and maxRB-NumberPSSCH; select an integer value in the interval [1, 10] from the allowed values configured by upper layers in restrictResourceReservationPeriod and set the resource reservation interval by multiplying 100 with the selected value; randomly select the time and frequency resources for transmission opportunities of SCI and SL-SCH corresponding to the number of transmissions of MAC PDUs with the resource reservation interval from the resource pool; consider the set as the selected sidelink grant; use the selected sidelink grant to determine the set of subframes in which transmissions of SCI and SL-SCH occur; and consider the selected sidelink grant to be a configured sidelink grant.

Further, the UE transmits a request for desired autonomous denial information to a network (S1113).

Preferably, desired autonomous information includes a desired maximum number of the uplink subframes for which the UE is allowed to deny any uplink transmissions and a validity period over which the uplink autonomous denial subframes shall be counted.

If there are multiple sets of autonomous denial configurations in the UE, the UE provides an index of the configuration the UE want to have new autonomous denial configuration compared to the previous autonomous denial configuration. It is assumed that when desired autonomous denial information is configured, the index information which indicates the corresponding denial information configuration.

Alternatively, the UE provides priority information of the configuration the UE want to have new autonomous denial configuration compared to the previous autonomous denial configuration. In this case, the priority can be PPPP or logical channel priority. Other priority information can be included.

The UE provides SPS index information of the configuration the UE want to have new autonomous denial configuration compared to the previous autonomous denial configuration, or Service identifiers of the configuration the UE want to have new autonomous denial configuration compared to the previous autonomous denial configuration, or Logical channel identities of the configuration the UE want to have new autonomous denial configuration compared to the previous autonomous denial configuration.

FIG. 12 is an example for transmitting a request for desired autonomous denial information for sidelink transmission prioritized over uplink transmission in wireless communication system according to embodiments of the present invention.

When link1 data and link2 data to be transmitted in a subframe are generated by a UE, the UE determines whether link1 transmission is required to be denied in a subframe (S1201).

The UE considers that link2 transmission is prioritized over the link1 transmission if a criteria is met (S1203) and the UE determines that link1 transmission is denied in the subframe (S1205). When the UE determines that link1 transmission is denied in the subframe, the UE performs autonomous denial procedure for link1 transmission and transmits link2 data in the subframe (S1207).

The steps of S1203 to S1207 are the same as the steps of S1103 to S1107 described above.

The UE transmits a request for desired autonomous denial information to a network if the number of subframes for which the UE is required to deny or the UE has denied any uplink transmission during the validity period is above a threshold value (S1209).

Preferably, validity period and threshold value indicates autonomousDenialValidity and autonomousDenialSubframes respectively which are configured via autonomous denial configuration.

The "autonomousDenialSubframes" indicates that the maximum number of the link1 subframes for which the UE is allowed to deny any link1 transmission. Value n2 corresponds to 2 subframes, n5 to 5 subframes and so on.

The "autonomousDenialValidity" indicates the validity period over which the link1 autonomous denial subframes shall be counted. Value sf200 corresponds to 200 subframes, sf500 corresponds to 500 subframes and so on.

When the one or more following conditions is met, the UE sends the assistance information to the network. In the following, validity period and threshold value indicates autonomousDenialValidity and autonomousDenialSubframes which are configured via autonomous denial configuration:

If the number of link1 subframe for which the UE is required to deny/the UE has denied any link1 transmission during the (configured) validity period is above the currently configured threshold value;

If the number of link1 subframe for which the UE is required to deny/the UE has denied any link1 transmission for transmission of data of a certain resource reservation process during the (configured) validity period is above the currently configured threshold value;

If the number of link1 subframe for which the UE is required to deny/the UE has denied any link1 transmission for transmission of data of associated priorities, services, SPSs and/or logical channels during the (configured) validity period is above the currently configured threshold value for priority(ies), service, SPSs, and/or logical channels;

Preferably, desired autonomous information includes a desired maximum number of the uplink subframes for which the UE is allowed to deny any uplink transmissions and a validity period over which the uplink autonomous denial subframes shall be counted.

If there are multiple sets of autonomous denial configurations in the UE, the UE provides an index of the configuration the UE want to have new autonomous denial configuration compared to the previous autonomous denial configuration. It is assumed that when desired autonomous denial information is configured, the index information which indicates the corresponding denial information configuration.

Alternatively, the UE provides priority information of the configuration the UE want to have new autonomous denial configuration compared to the previous autonomous denial configuration. In this case, the priority can be PPPP or logical channel priority. Other priority information can be included.

The UE provides SPS index information of the configuration the UE want to have new autonomous denial configuration compared to the previous autonomous denial configuration, or Service identifiers of the configuration the UE want to have new autonomous denial configuration compared to the previous autonomous denial configuration, or Logical channel identities of the configuration the UE want to have new autonomous denial configuration compared to the previous autonomous denial configuration.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
   triggering sidelink resource reselection,
   wherein the sidelink resource reselection is triggered based on a number of subframes, for which the UE is required to deny any uplink transmission during an autonomous denial procedure, being greater than a threshold value,
   wherein the autonomous denial procedure for uplink transmission is performed based on uplink transmission and sidelink transmission being overlapped in a subframe, wherein the subframe is one of subframes allowed for denial of the uplink transmission during a validity period; and
   performing the sidelink resource reselection,
   wherein performing the sidelink resource reselection comprises:
      clearing a current configured sidelink grant;
      selecting transmission parameters and new resources to be considered as a selected sidelink grant; and
      considering the selected sidelink grant to be a new configured sidelink grant.

2. The method according to claim 1, wherein the autonomous denial procedure includes:
   counting a number of subframes in which the uplink transmission is denied during the validity period,
   wherein the uplink transmission is denied until the number of the subframes in which the uplink transmission is denied reaches a maximum number, based on the sidelink transmission being prioritized over the uplink transmission.

3. The method according to claim 1, wherein the sidelink resource reselection is performed per UE, or per resource reservation process, or per priority, or per logical channel, or per SPS, or per service type.

4. The method according to claim 1, further comprising:
transmitting a request for desired autonomous denial information to a network,
wherein desired autonomous information includes (i) a desired maximum number of uplink subframes for which the UE is allowed to deny any uplink transmission and (ii) a validity period over which the uplink autonomous denial subframes shall be counted.

5. The method according to claim 1, wherein the sidelink transmission is for Vehicle-to-Everything (V2X) services.

6. A User Equipment (UE) configured to operate in a wireless communication system, the UE comprising:
a Radio Frequency (RF) module; and
a processor operably coupled with the RF module and configured to:
trigger sidelink resource reselection,
wherein the sidelink resource reselection is triggered based on a number of subframes, for which the UE is required to deny any uplink transmission during an autonomous denial procedure, being greater than a threshold value,
wherein the autonomous denial procedure for uplink transmission is performed based on uplink transmission and sidelink transmission being overlapped in a subframe, wherein the subframe is one of subframes allowed for denial of the uplink transmission during a validity period; and
perform the sidelink resource reselection,
wherein performing the sidelink resource reselection comprises:
clearing a current configured sidelink grant;
selecting transmission parameters and new resources to be considered as a selected sidelink grant; and
considering the selected sidelink grant to be a new configured sidelink grant.

7. The UE according to claim 6, wherein the autonomous denial procedure includes:
counting a number of subframes in which the uplink transmission is denied during the validity period,
wherein the uplink transmission is denied until the number of the subframes in which the uplink transmission is denied reaches a maximum number, based on the sidelink transmission being prioritized over the uplink transmission.

8. The UE according to claim 6, wherein the sidelink resource reselection is performed per UE, or per resource reservation process, or per priority, or per logical channel, or per SPS, or per service type.

9. The UE according to claim 6, wherein the processor is further configured to:
transmit a request for desired autonomous denial information to a network,
wherein desired autonomous information includes (i) a desired maximum number of uplink subframes for which the UE is allowed to deny any uplink transmission and (ii) a validity period over which the uplink autonomous denial subframes shall be counted.

10. The UE according to claim 6, wherein the sidelink transmission is for Vehicle-to-Everything (V2X) services.

* * * * *